(12) United States Patent
Singh et al.

(10) Patent No.: US 12,332,304 B1
(45) Date of Patent: Jun. 17, 2025

(54) SYSTEM AND METHOD FOR AUTOMATIC FAULT DETECTION IN AN ELECTRONIC DESIGN

(71) Applicant: Cadence Design Systems, Inc., San Jose, CA (US)

(72) Inventors: Sushobhit Singh, Uttar Pradesh (IN); Arvind Nembili Veeravalli, Karnataka (IN); Naresh Kumar, Uttar Pradesh (IN); Mahesh D. Sadhankar, Uttar Pradesh (IN); Daksh Bakshi, Haryana (IN)

(73) Assignee: Cadence Design Systems, Inc., San Jose, CA (US)

( * ) Notice: Subject to any disclaimer, the term of this patent is extended or adjusted under 35 U.S.C. 154(b) by 360 days.

(21) Appl. No.: 17/897,360

(22) Filed: Aug. 29, 2022

(51) Int. Cl.
*G01R 31/317* (2006.01)

(52) U.S. Cl.
CPC .............................. *G01R 31/31725* (2013.01)

(58) Field of Classification Search
CPC ................................................ G01R 31/31725
See application file for complete search history.

(56) References Cited

U.S. PATENT DOCUMENTS

| | | | |
|---|---|---|---|
| 8,683,419 B1* | 3/2014 | Hines | G06F 30/327 |
| | | | 716/132 |
| 10,114,920 B1* | 10/2018 | Gupta | G06F 30/3312 |
| 10,915,685 B1* | 2/2021 | Gupta | G06F 30/327 |
| 2024/0004767 A1* | 1/2024 | Kerry | G06F 11/079 |

* cited by examiner

*Primary Examiner* — Manuel A Rivera Vargas
(74) *Attorney, Agent, or Firm* — Mark H. Whittenberger; Holland & Knight LLP

(57) ABSTRACT

Embodiments include herein are directed towards a method for automatic detection during a timing analysis. Embodiments may include reading, using a processor, design and power intent information associated with an electronic design and automatically identifying a plurality of inter-power domain paths from the design and power intent information. Embodiments may further include automatically filtering the plurality of inter-power domain paths to identify one or more faulty inter-power domain paths using a graph-based approach and automatically generating a report depicting the one or more faulty inter-power domain paths.

20 Claims, 11 Drawing Sheets

```
##############################################
#Early Check Path Count Summary Output#
##############################################

Multiple IPD Data Crossings : 3
- - - - - - - - - - - - - - - - - - - - - - -
Count          |Power Domains
- - - - - - - - - - - - - - - - - - - - - - -
2              |pd_VDD->pd_VDDA0->pd_VDD
1              |pd_VDD->pd_VDDP2->pd_VDDA0

IPD Clock Divergence : 2
- - - - - - - - - - - - - - - - - - - - - - -
Count          |Power Domains
- - - - - - - - - - - - - - - - - - - - - - -
2              |pd_VDD->pd_VDDP2

Multiple IPD Clock Crossings : 1
- - - - - - - - - - - - - - - - - - - - - - -
Count          |Power Domains
- - - - - - - - - - - - - - - - - - - - - - -
1              |pd_VDD->pd_VDDP2->pd_VDD->pdVDD]
```

SYSTEM AND METHOD FOR AUTOMATIC FAULT DETECTION IN AN ELECTRONIC DESIGN

FIELD OF THE INVENTION

The present disclosure relates to a method of electronic circuit design, and more particularly, to a method of performing automatic fault detection and diagnostics in inter-power/voltage domain (IPD) based timing analysis associated with an electronic design.

BACKGROUND

Static timing analysis (STA) is a method to assess the timing of any given digital circuit using software techniques and certain models that provide relevant characteristics of the digital circuit. High-performance integrated circuits have traditionally been characterized by the clock frequency at which they operate. Measuring the ability of a circuit to operate at the specified speed may require an ability to measure, during the design process, its delay at numerous steps. Moreover, any delay calculation should be incorporated into the inner loop of timing optimizers at various phases of design, such as logic synthesis, layout (e.g., placement and routing), and in in-place optimizations performed late in the design cycle. While such timing measurements may theoretically be performed using a rigorous circuit simulation, such an approach is likely to be too slow to be practical. Static timing analysis plays a vital role in facilitating the fast and reasonably accurate measurement of circuit timing. The speedup comes from the use of simplified timing models and by generally ignoring logical interactions in circuits. This has become a mainstay of design over the last few decades.

IPD analysis involves analyzing timing paths crossing multiple voltage domains, on either clock network or data network. IPD paths are identified based on the various criteria. Some of these include voltage level shifting or crossings on the data path. Here, all paths through such cells are classified as the IPD paths. Other criteria that may be used to identify IPD paths include voltage level shifting or crossing on the clock path. For example, power domain crossing (PDC) appears on the launch and capture path post common point on the timing path and/or PDC appears on a launch or capture path.

SUMMARY

In one or more embodiments of the present disclosure, a computer-implemented method for automatic detection during a timing analysis. Embodiments may include reading, using a processor, design and power intent information associated with an electronic design and automatically identifying a plurality of inter-power domain paths from the design and power intent information. Embodiments may further include automatically filtering the plurality of inter-power domain paths to identify one or more faulty inter-power domain paths using a graph-based approach and automatically generating a report depicting the one or more faulty inter-power domain paths.

One or more of the following features may be included. The method may include receiving a user input identifying a fault type or fault region. The graph based approach may include generating an inter-power domain graph. The inter-power domain graph may include a direct acyclic graph representation of connectivity and adjacency information of all power domain crossings in the electronic design. The report may include at least one of exact power domain transition information, instance/net transition information, data path information, clock path information, and capture path information. Identifying one or more faulty inter-power domain paths may be common path pessimism removal aware. Identifying one or more faulty inter-power domain paths may include mining path level power domain transition and transition instance/net information including begin point, end point, and clock information.

In one or more embodiments of the present disclosure a computer-readable storage medium having stored thereon instructions, which when executed by a processor result in one or more operations for automatic detection during a timing analysis is provided. Operations may include reading, using a processor, design and power intent information associated with an electronic design and identifying a plurality of inter-power domain paths from the design and power intent information. Operations may further include filtering the plurality of inter-power domain paths to identify one or more faulty inter-power domain paths using a graph-based approach and generating a report depicting the one or more faulty inter-power domain paths.

One or more of the following features may be included. Operations may include receiving a user input identifying a fault type or fault region. The graph based approach may include generating an inter-power domain graph. The inter-power domain graph may include a direct acyclic graph representation of connectivity and adjacency information of all power domain crossings in the electronic design. The report may include exact power domain transition information and instance/net transition information. Identifying one or more faulty inter-power domain paths may be common path pessimism removal aware. Identifying one or more faulty inter-power domain paths may include mining path level power domain transition and transition instance/net information including begin point, end point, and clock information.

In one or more embodiments of the present disclosure, a system for automatic detection during a timing analysis is provided. The system may include a computing device having at least one processor configured to read design and power intent information associated with an electronic design. The at least one processor may be further configured to identify a plurality of inter-power domain paths from the design and power intent information and filter the plurality of inter-power domain paths to identify one or more faulty inter-power domain paths using a graph-based approach. The at least one processor may be further configured to generate a report depicting the one or more faulty inter-power domain paths. The at least one processor may be further configured to receive a user input identifying a fault type or fault region. The graph based approach may include generating an inter-power domain graph. The inter-power domain graph may include a direct acyclic graph representation of connectivity and adjacency information of all power domain crossings in the electronic design. The report includes exact power domain transition information and instance/net transition information. Identifying one or more faulty inter-power domain paths may be common path pessimism removal aware.

One or more of the following features may be included. The at least one processor may be further configured to receive a user input identifying a fault type or fault region. The graph based approach may include generating an inter-power domain graph. The inter-power domain graph may include a direct acyclic graph representation of connectivity and adjacency information of all power domain crossings in the electronic design. The report may include exact power domain transition information and instance/net transition information. Identifying one or more faulty inter-power domain paths may be common path pessimism removal aware. Identifying one or more faulty inter-power domain paths may include mining path level power domain transition and transition instance/net information including begin point, end point, and clock information.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 9 is a diagram showing a detailed summary according to an embodiment of the present disclosure;

FIG. 10 is diagram showing a count summary according to an embodiment of the present disclosure; and FIG. 11 is a diagram showing a path description according to an embodiment of the present disclosure.

DETAILED DESCRIPTION

Figure 1:
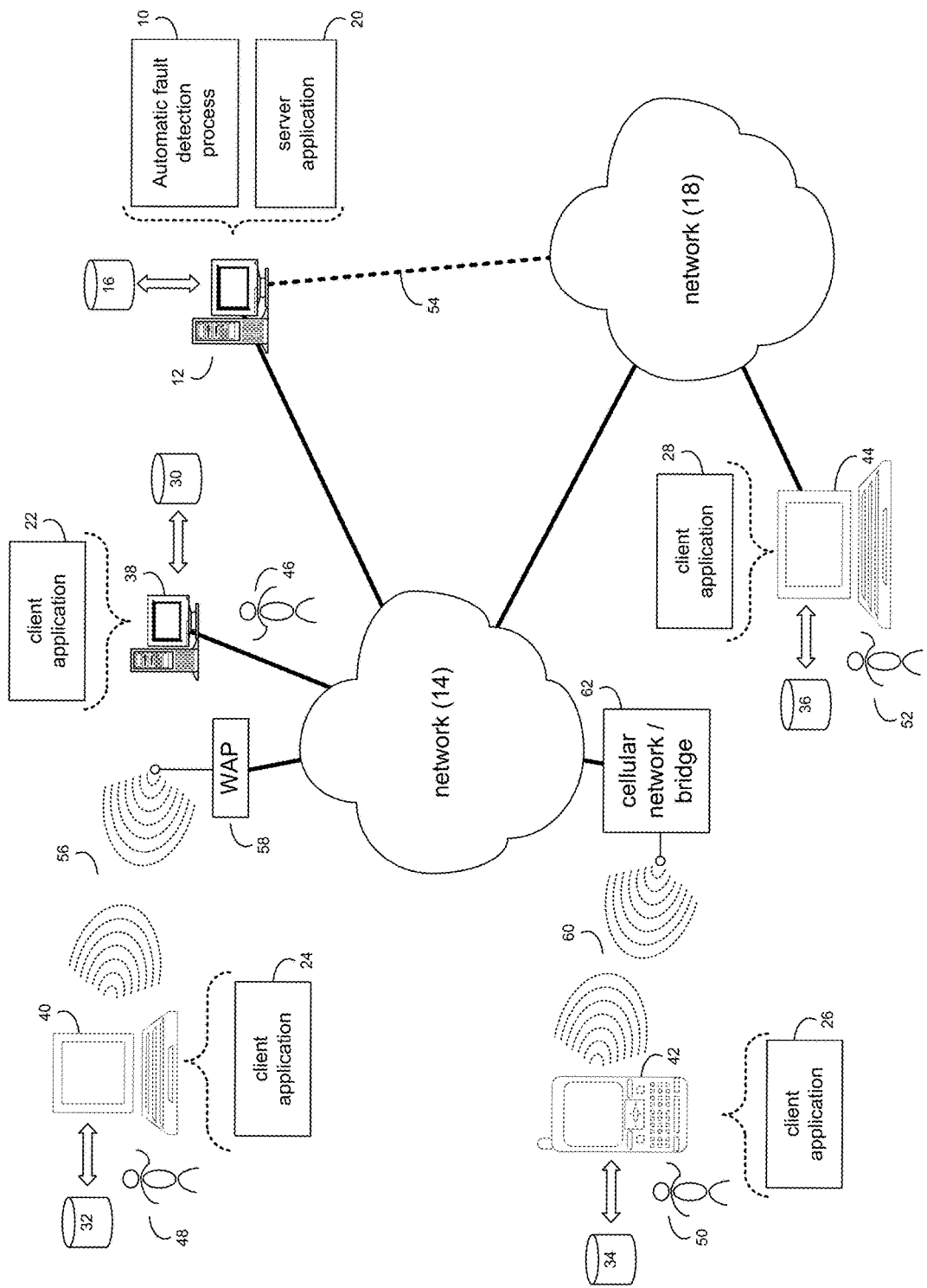
FIG. 1 diagrammatically depicts an automatic fault detection process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings denote like elements.

Referring to FIG. 1, there is shown an automatic fault detection process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the fault detection process may reside on a client electronic device, such as a personal computer, notebook computer, personal digital assistant, or the like.

The instruction sets and subroutines of automatic fault detection process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute automatic fault detection process 10. Examples of client applications 22, 24, 26, 28 may include, but are not limited to, design verification tools such as those available from the assignee of the present disclosure. These applications may also be executed by server computer 12. In some embodiments, automatic fault detection process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the automatic fault detection process may be a client-side application (not shown) residing on one or more client electronic devices 38, 40, 42, 44 (e.g., stored on storage devices 30, 32, 34, 36, respectively). As such, the fault detection process may be a stand-alone application that interfaces with a client application (e.g., client applications 22, 24, 26, 28), or may be an applet/application that is executed within a client application. As such, the fault detection process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, automatic fault detection process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
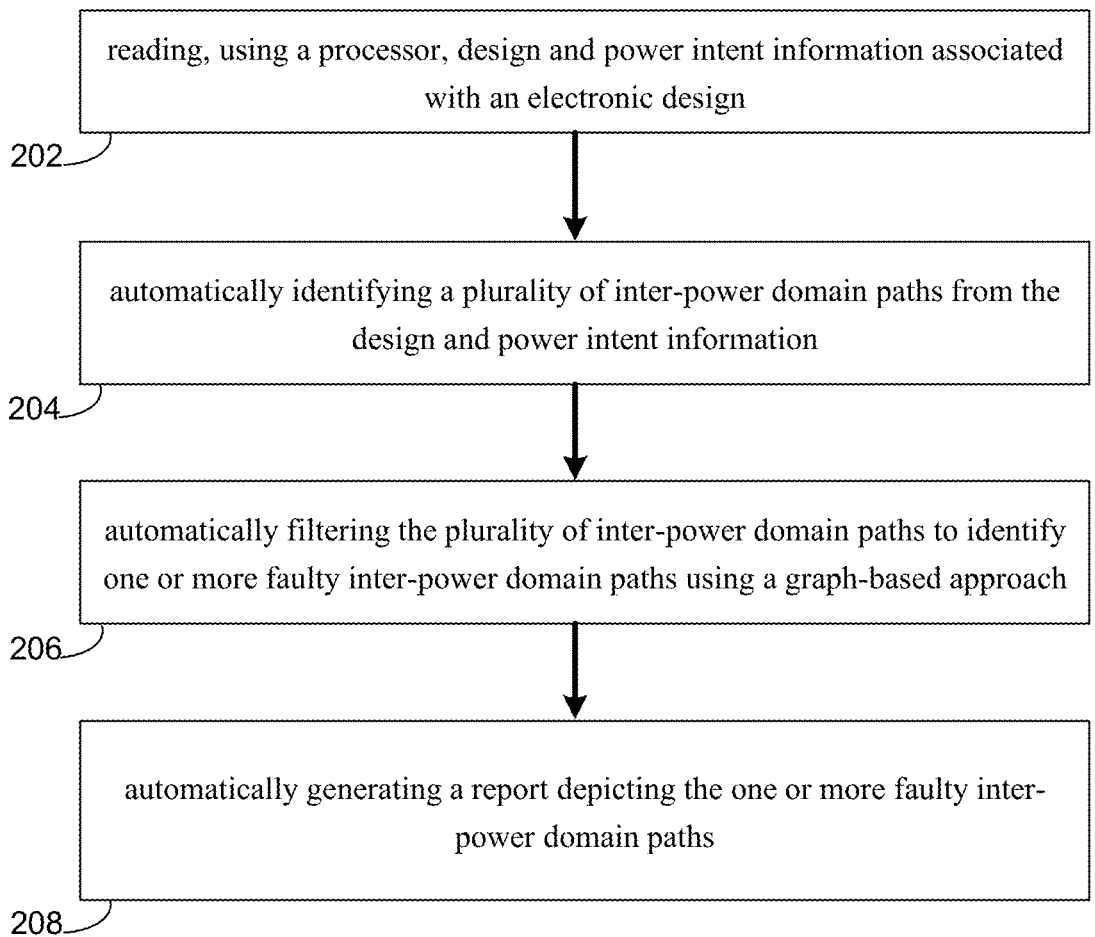
FIG. 2 is an exemplary flowchart of an automatic fault detection process according to an embodiment of the present disclosure.

Referring now to FIG. 2, a flowchart depicting an embodiment consistent with automatic fault detection process 10 is provided. Embodiments may include reading (202), using a processor, design and power intent information associated with an electronic design and automatically identifying (204) a plurality of inter-power domain paths from the design and power intent information. Embodiments may further include automatically filtering (206) the plurality of inter-power domain paths to identify one or more faulty inter-power domain paths using a graph-based approach and automatically generating (208) a report depicting the one or more faulty inter-power domain paths. Numerous other operations are also within the scope of the present disclosure as provided in further detail hereinbelow.

Figure 3:
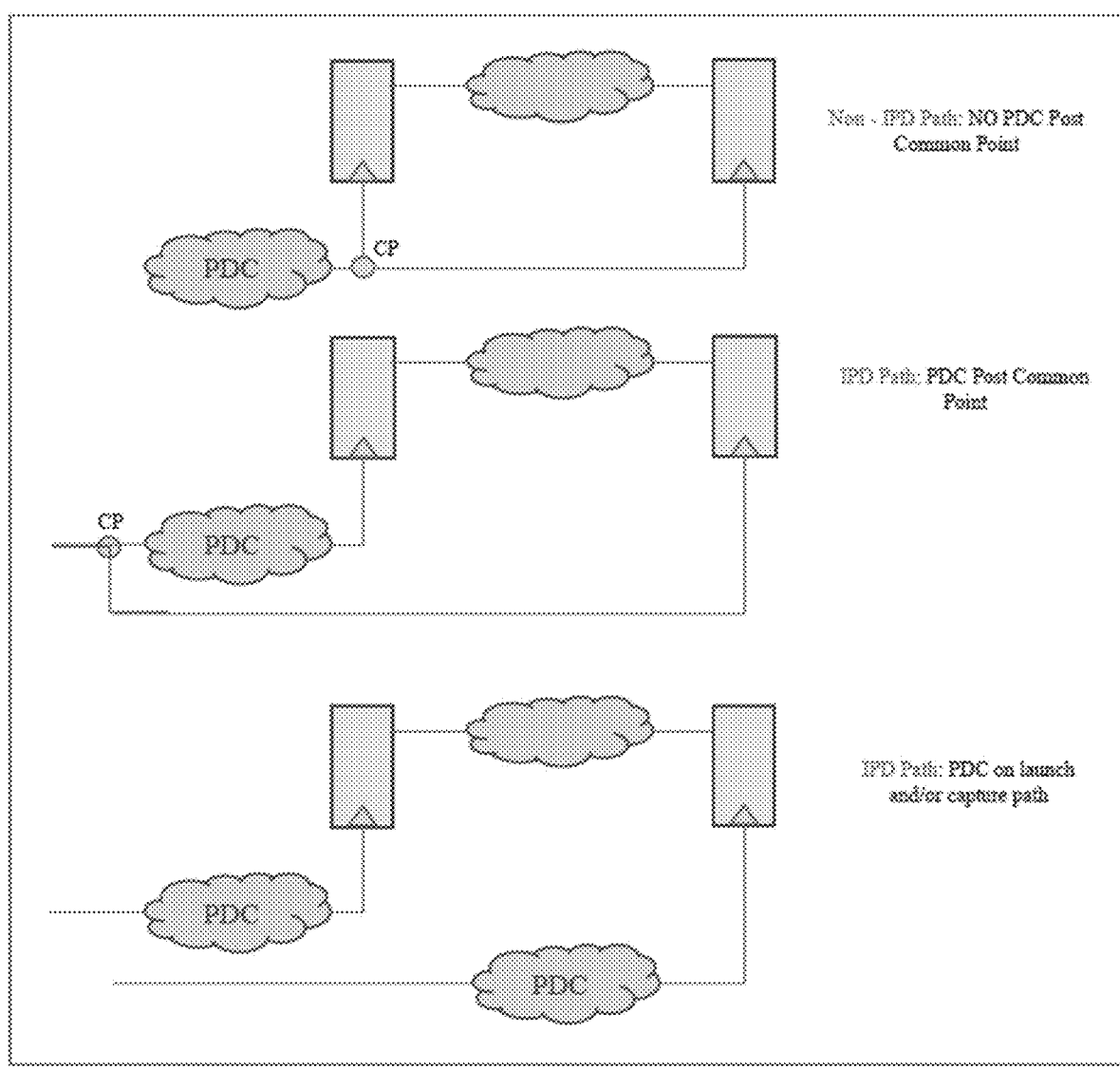
FIG. 3 is a diagram showing IPD paths according to an embodiment of the present disclosure.

As discussed above, and referring now to FIG. 3, IPD paths may be identified based upon various criteria. In the example of FIG. 3, voltage level shifting or crossings on the data path and/or clock path are shown. With regard to the data path, all paths through such cells are classified as the IPD paths. With regard to the clock path, a PDC may appear on the launch and capture path post common point on the timing path and/or PDC appears on a launch or capture path.

Designers need an efficient and automated way to ensure the sanity of any IPD implementation in the circuit. These may cause severe issues downstream in the flow if not checked upfront, any such undesired design scenario referred to herein as an "IPD Path Fault". Since IPD is an emerging theme in how sign-off and design robustness checks are performed the lack of a solution in this area causes problems in design implementation and sign-off leading to power, performance, and area (PPA) target shortfalls. Some of the typical faults that occur in IPD paths are discussed below.

Figure 4:
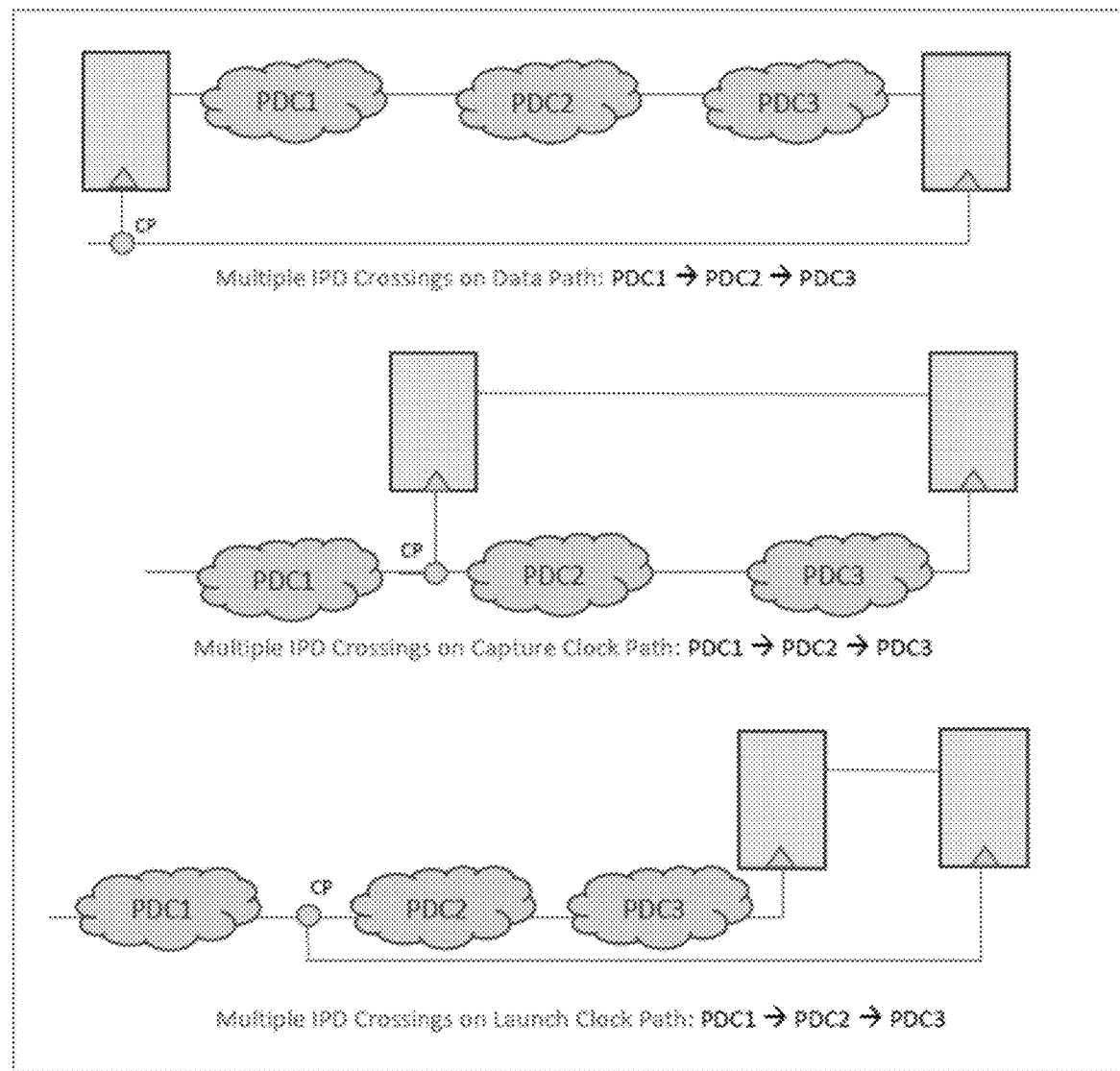
FIG. 4 is a diagram showing multiple IPD crossings on a path according to an embodiment of the present disclosure.

On a given timing path segment such as data or clock (e.g., capture or launch) there should be one power/voltage domain crossing as the presence of multiple power domains may complicate IPD signoff. For example, for a given path there may be more than 4 combinations needed for analysis. To this end, any EDA application should be able to determine the IPD paths that have multiple IPD crossings on the path, which would allow designers to avoid such design scenarios. FIG. 4 describes few such design scenarios, which are expected to be flagged as multiple crossings scenarios.

Figure 5:
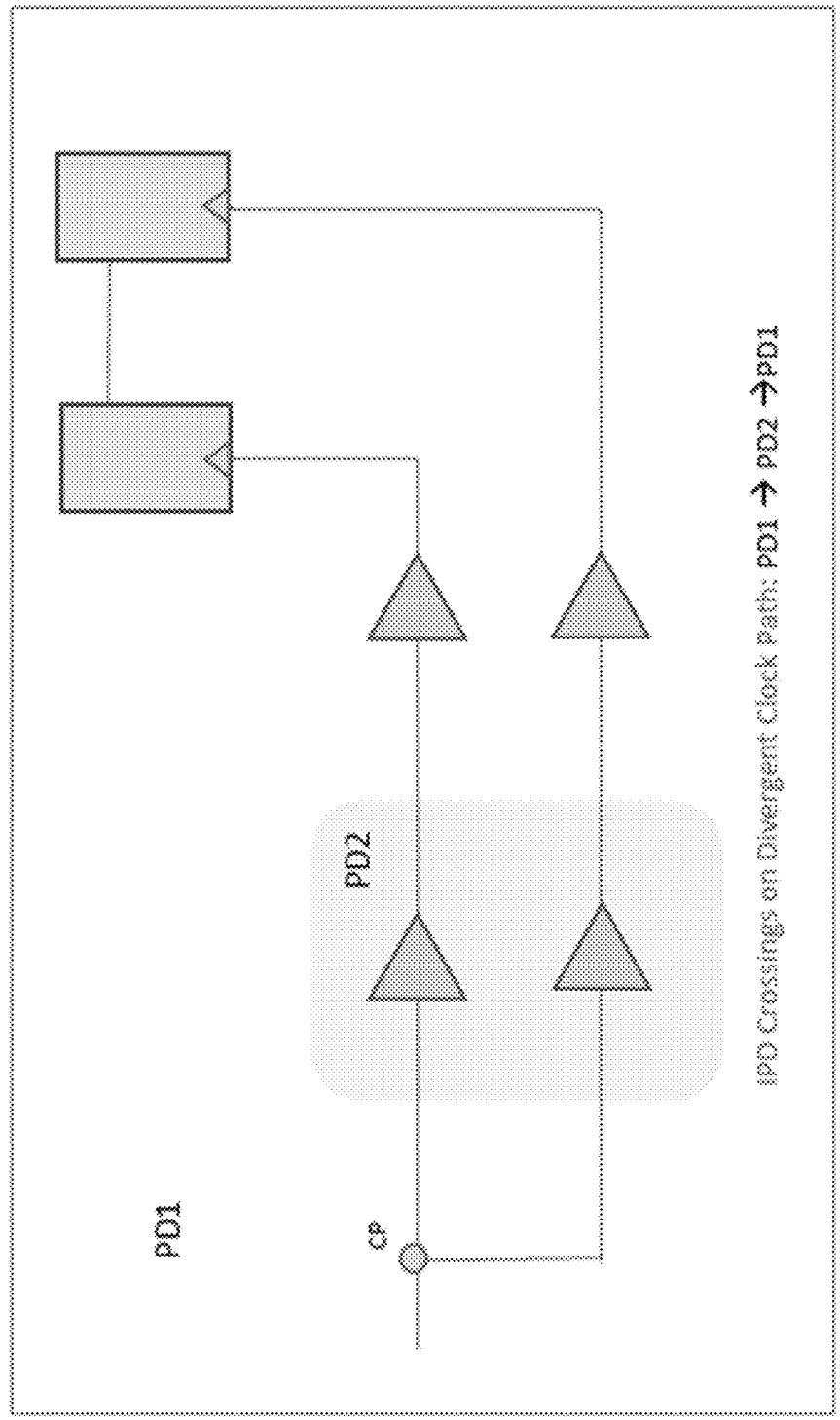
FIG. 5 is a diagram showing a clock divergent IPD path according to an embodiment of the present disclosure.

Moreover, if there are paths which have common IPD crossings, which have the same power/voltage domain transition post common point, they should be flagged as clock divergent paths. FIG. 5 shows a clock divergent path, where the PD2 transition could have been avoided in the design, thus impacting PPA.

As discussed above, these faults may cause serious issues, including chip failure. As designs are becoming increasingly complex, these faults are impossible to identify and address manually. Accordingly, embodiments of automatic fault detection process 10 provide a solution that may automatically identify such faults and report them in meaningful way so that designers can review and take corrective actions.

In some embodiments, automatic fault detection process 10 may be configured to perform fault detection in the early stages of design cycle. For example, during a pre-layout stage, thus allowing the designers to fix the structural sanity failures early on with minimum impact in the later design cycle. Fault detection may be possible in a standalone or distributed timing analysis session. Path detection may be performed with agility as these paths can be buried deep under for paths leading to an endpoint. In order to achieve the desired coverage and agility, embodiments of automatic fault detection process 10 may adapt a graph-based approach, rather than examining on path basis. For some designs the total number of IPD paths may be close to 1% of the total paths, while the faulty paths may be a very miniscule portion of all the IPD paths. Embodiments of automatic fault detection process 10 may first identify the IPD paths among all paths and perform a second level filtering by fault detection. This needs considerable computation effort and can impact the overall timing analysis turnaround time (TAT) if not performed efficiently. Table 1 provided below shows an example of the number of endpoints possible in a design.

TABLE 1

| Design Size | Total Endpoints | Total IPD Endpoints | Faulty IPD Endpoints |
|---|---|---|---|
| 210M | 45M | 118k | 90k |
| 86M | 21M | 22k | 18k |
| 42M | 9M | 10k | 7k |
| 20M | 5.4M | 2k | 155 |

In some embodiments, automatic fault detection process 10 may be configured to provide the ability to perform fault path detection accounting for CPPR (common path pessimism removal). The process may also report these faults and/or filter them when performing the structural IPD path analysis. Additional information regarding CPPR and related topics may be found in U.S. Pat. No. 10,467,365, available from the Assignee of the subject application, which is hereby incorporated by reference in its entirety.

In some embodiments, automatic fault detection process 10 may be configured to provide a method to report the exact power domain transitions along with the instance/net on which the transition is happening, with CPPR awareness. Any crossings on the path which are prior to the common point should not interest the user.

In some embodiments, automatic fault detection process 10 may be configured to provide a method to extract and present the faults in IPD logic/paths in a user readable format. This allows a user to review the identified logic and associated faults. This information is necessary for fixing the fault through the design. Automatic fault detection process 10 may also provide a method for the user to define the fault detection region, using IPD crossings/power domains as a mechanism for generating the faulty paths.

Figure 6:
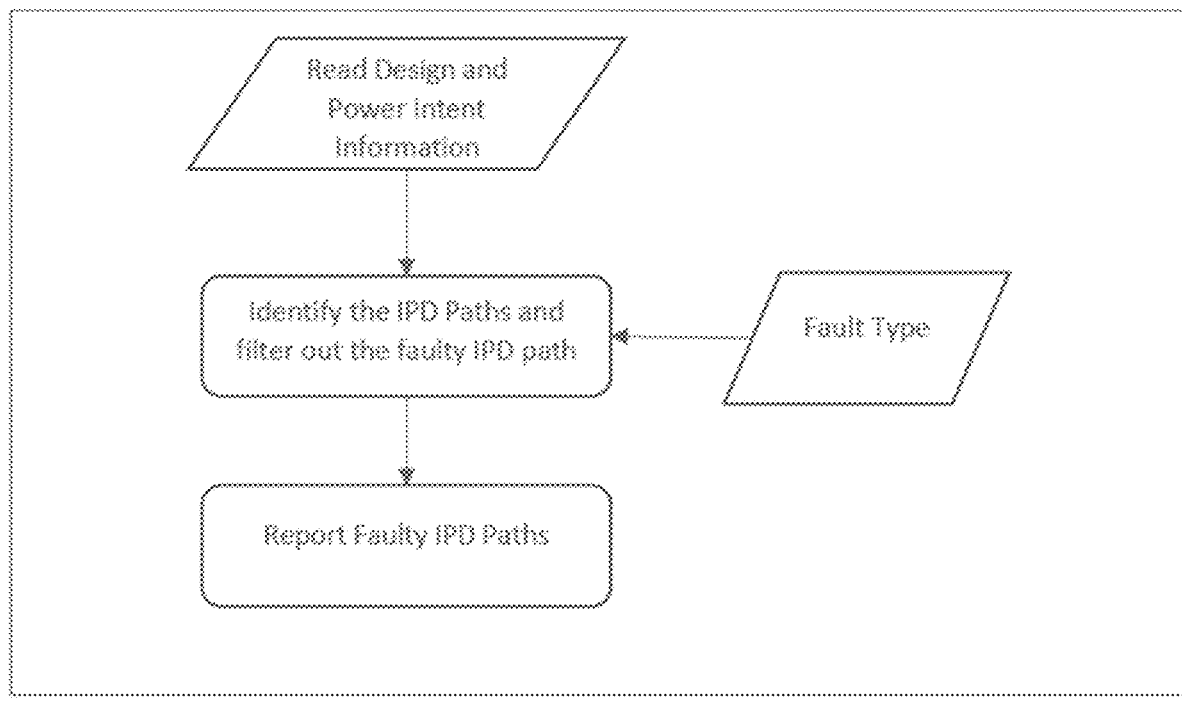
FIG. 6 is an exemplary flowchart of an automatic fault detection process according to an embodiment of the present disclosure.

Referring now to FIG. 6, a flowchart 600 showing one or more operations consistent with embodiments of automatic fault detection process 10 is provided. As discussed above, embodiments included herein may be configured to identify all of the IPD paths and filter the faulty paths. It should be noted that the operations shown in FIG. 6 may all be performed automatically. In some embodiments the process may initiate after a user has selected a particular fault type.

In some embodiments, automatic fault detection process 10 may generate various reports for the user to consume and act on one or more faulty paths. Some of these include, but are not limited to, path descriptions data, power/voltage domain transition path count summary, detailed power/voltage domain transition reports, etc. Path descriptions data may include a detailed set of path descriptions for each faulty path. This is the complete description including the start-end pin and clock set. The power/voltage domain transition path count summary may indicate the count of faulty paths for a given IPD crossing or set of IPD crossings. This acts as a measure of severity of IPD structural faults in the design. The detailed power/voltage domain transition report is a report of one path for a given IPD crossing or a set of IPD crossings, allowing the user to go to the path and fix the fault. Each of these reports and their generation are discussed in further detail hereinbelow.

In some embodiments, automatic fault detection process 10 may include both the identification of IPD paths as well as the filtering of faulty paths. The process includes reporting the faulty paths. This reporting may be performed for specific or all fault types and the filter may be applied to reporting based upon some user input.

Figure 7:
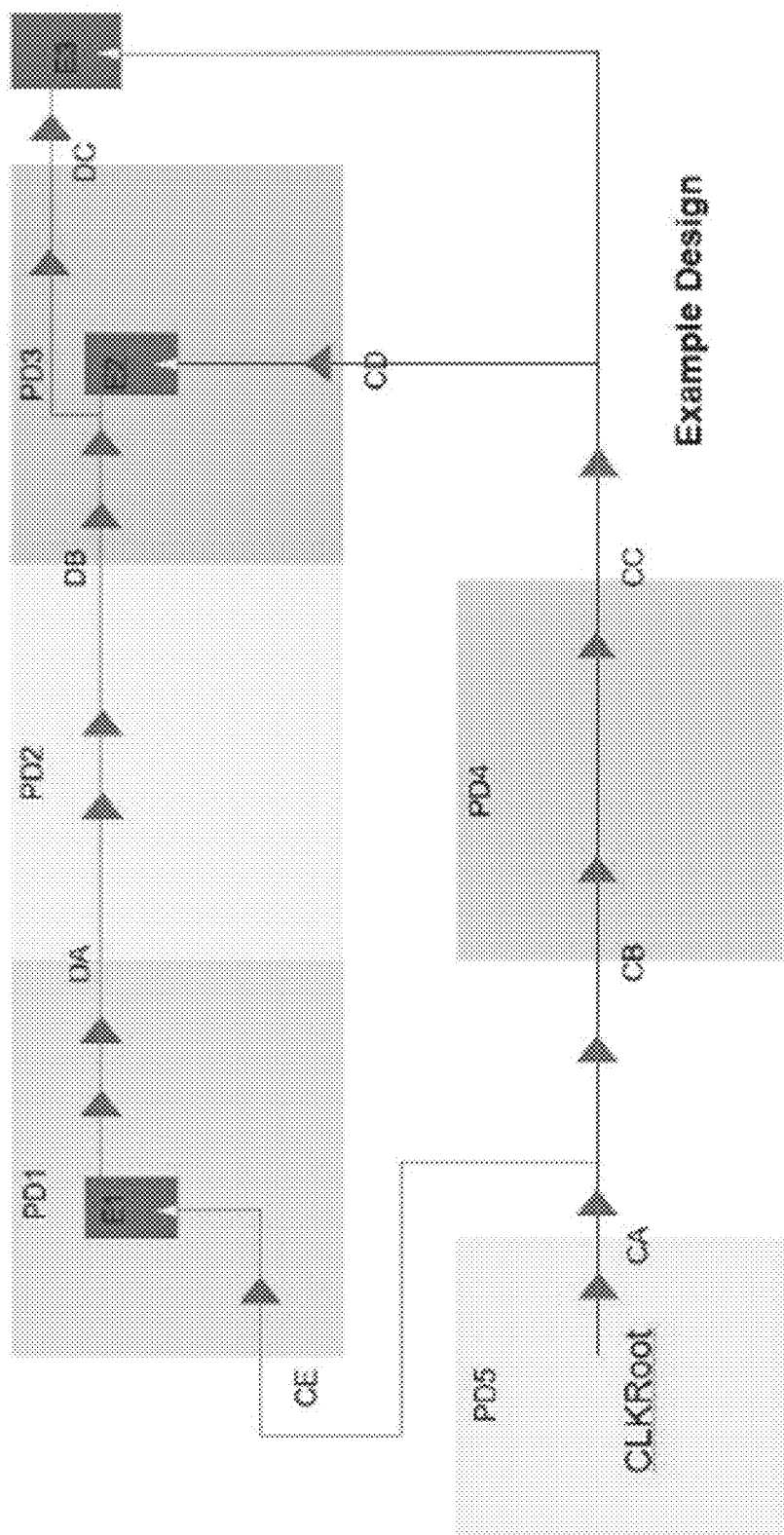
FIGS. 7-8 show diagrams of an IPD graph representation of a sample design according to an embodiment of the present disclosure.
Figure 8:
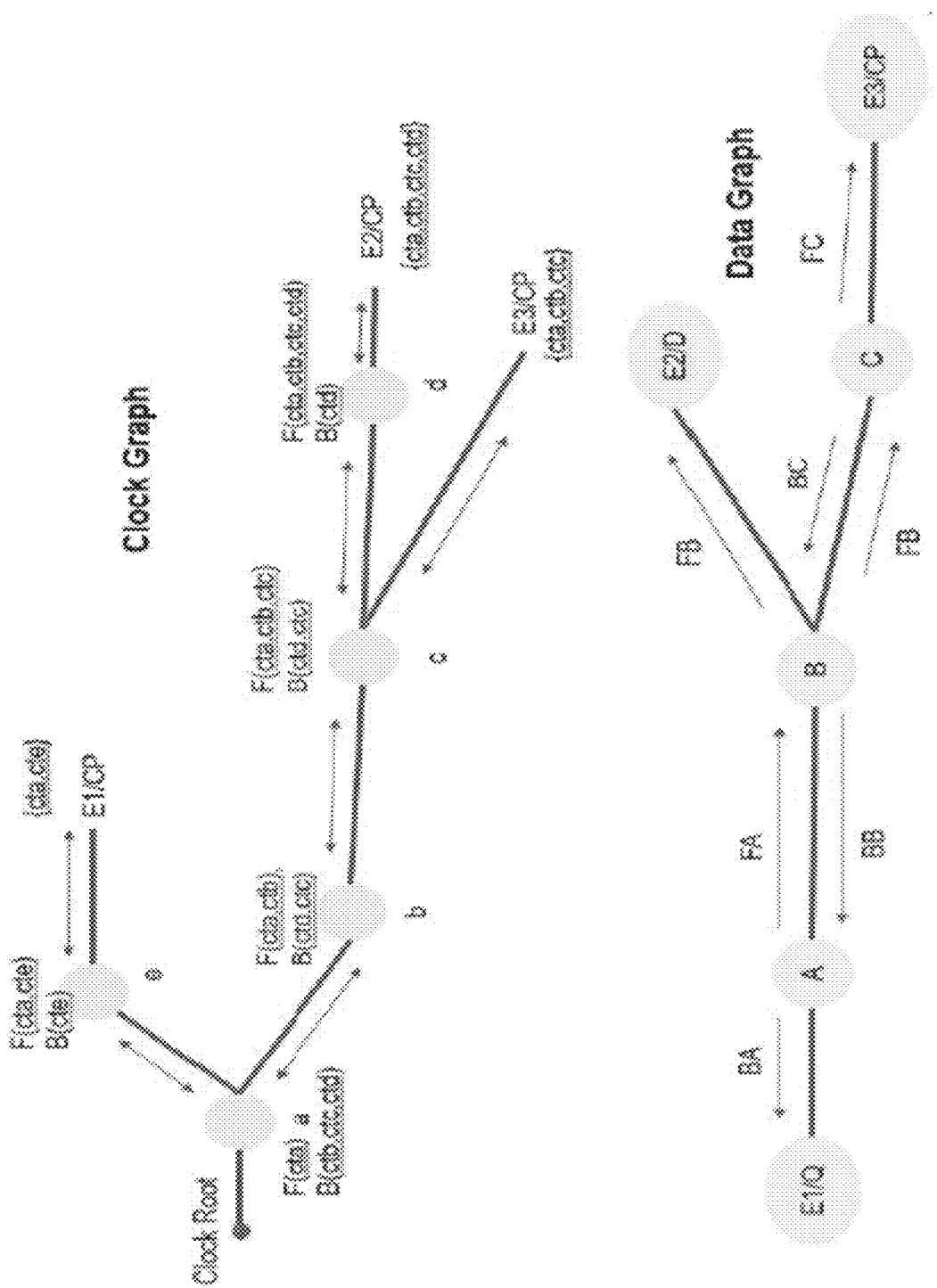

In some embodiments, and referring now to FIGS. 7-8, automatic fault detection process 10 may generate an IPD graph, which is a direct acyclic graph "DAG" representation of connectivity and adjacency information of all of the power domain crossings in the design. Each power domain crossing may act as a vertex on the IPD graph, while the edges are the skimmed representation of the physical path between the two IPD crossings. There are two components of the IPD graph, namely the IPD data graph and the IPD clock graph. FIG. 7 presents an example data graph and a clock graph is shown in FIG. 8.

Examples showing the generation of the IPD data graph are discussed in further detail hereinbelow. In operation, and as shown in FIG. 7, each valid data crossing may be converted into the vertex of the graph, and unique forward/backward tags may be initiated on the vertex. These tags are unique to the vertex and act as vertex identifiers on the complete data network which is a fanin or fanout of the vertex. For each vertex on the graph, the process may start propagating the vertex tags on the fanout and fanin data network. For each arc on the path, the process may copy the tag from source to sink on the arc while propagating forward, and vice-versa while propagating backward. If the arc is a valid IPD arc, or a vertex, then the process may copy the tag in the incoming tags to this vertex, and further propagation may occur with vertex tag. If a sink pin of the arc is a valid end point while propagating forward, or, if source pin of the arc is a valid start point while propagating backward. The start/endpoint are the terminal vertices of the IPD data graph. At the end of last two steps for all IPD crossings, every vertex has the information built about the incoming backward and forward vertex tags. Every start and endpoint are also captured in the IPD graph, which is relevant for the IPD analysis.

In some embodiments, and as shown in FIG. 8, the IPD clock graph may be generated by a single forward iteration from the clock root to clock end points in the design and capturing the IPD crossings along the path, which act as the vertices on the clock graph. Each clock graph vertex has a unique originating forward tag which may be propagated forward to each clock end point hence each clock endpoint clearly knows the incoming IPD crossing vertices, as shown in FIG. 8. On a clock graph each clock path pin also has a set of backward tags originating on crossings.

In some embodiments, the process of generating the clock graph may occur using the operations set forth below. In operation, each valid clock crossing may be converted into the vertex of the graph, and unique forward/backward tags may be initiated on the vertex. These tags are unique to the vertex and act as vertex identifiers on a complete clock network which is in the fan-in or fanout of the vertex. In addition to the IPD crossings, the clock root point and the clock network endpoints may also act as clock graph vertices. For each clock root vertex in the design the process may propagate from the clock root, through all derived clocks of the clock on the root. For each arc, the process may copy the tag from the source to the sink of the arc. If there is an existing tag on the pin, merge the tag on source into sink. If the arc is an IPD arc, a new tag may be merged into the existing set on the sink pin of the IPD arc which corresponds to the new vertex. While unwinding this propagation, the process may backward propagate the unique vertex tags starting from source pin of the IPD arc. At the end of the above steps each relevant pin on the clock network, will have the forward set of all incoming IPD crossing tags and the backward crossing set of the last crossings seen on the path.

In some embodiments, automatic fault detection process 10 may be configured to extract multiple data IPD crossings. Multiple data power domain crossing identification is an iterative process where automatic fault detection process 10 may enumerate higher order pairs in each iteration and receive feedback from timing analysis for validity of path. The process is outlined below. For Pass N=1, group all the valid data IPD crossings as candidates for multi-PD data groups. For Pass N>1, if there are valid groups in Pass N−1, then for each group G in Pass N−1, if the left most leaf of G has incoming leaf group and forms a valid constraint timing path, create an N level group. Table 2 depicts the multi-pass flow, for the design example shown in FIGS. 7-8.

TABLE 2

| PASS | Groups | Comments |
|---|---|---|
| 0 | {A} {B} {C} | |
| 1 | {A B} {B C} | Early check 2 crossings |
| 2 | {A B C} | Early check 3 crossings |

In some embodiments, automatic fault detection process 10 may be configured to extract multiple clock IPD crossings. Extracting multiple PD crossing on the clock path may be performed by choosing the clock end points which are part of the IPD network and extracting the clock IPD crossings from the clock root to this clock end point. This process may include identifying the clock end points which are part of IPD network. To this end, IPD network identification may be needed to be invoked. Then, for each clock pin in IPD network the process may check recursively if till root there are more than one IPD vertex, having relevant clock derivatives reaching the end point. Table 3 shows an example of multiple clock crossing end points.

TABLE 3

| Clock End Point | Clock IPD Crossings |
|---|---|
| E1/CP | {CA CE} |
| E2/CP | {CA CB CC CD} |
| E3/CP | {CA CB CC} |

In some embodiments, automatic fault detection process 10 may be configured to extract clock divergence. Extracting clock divergent paths may involve identifying the IPD crossings post common point, which shares the same source and sink power domain definitions. This process may include identifying all path start-end point pairs which form IPD paths due to IPD crossings post common point. The process may then match the backward IPD crossings on the common point with the forward IPD crossings on the end point. This may be performed for both launch and capture clock end points. The process may then match the source and sink power domains for all the crossings on capture and launch clocks to report the clock divergent paths.

Figure 9:
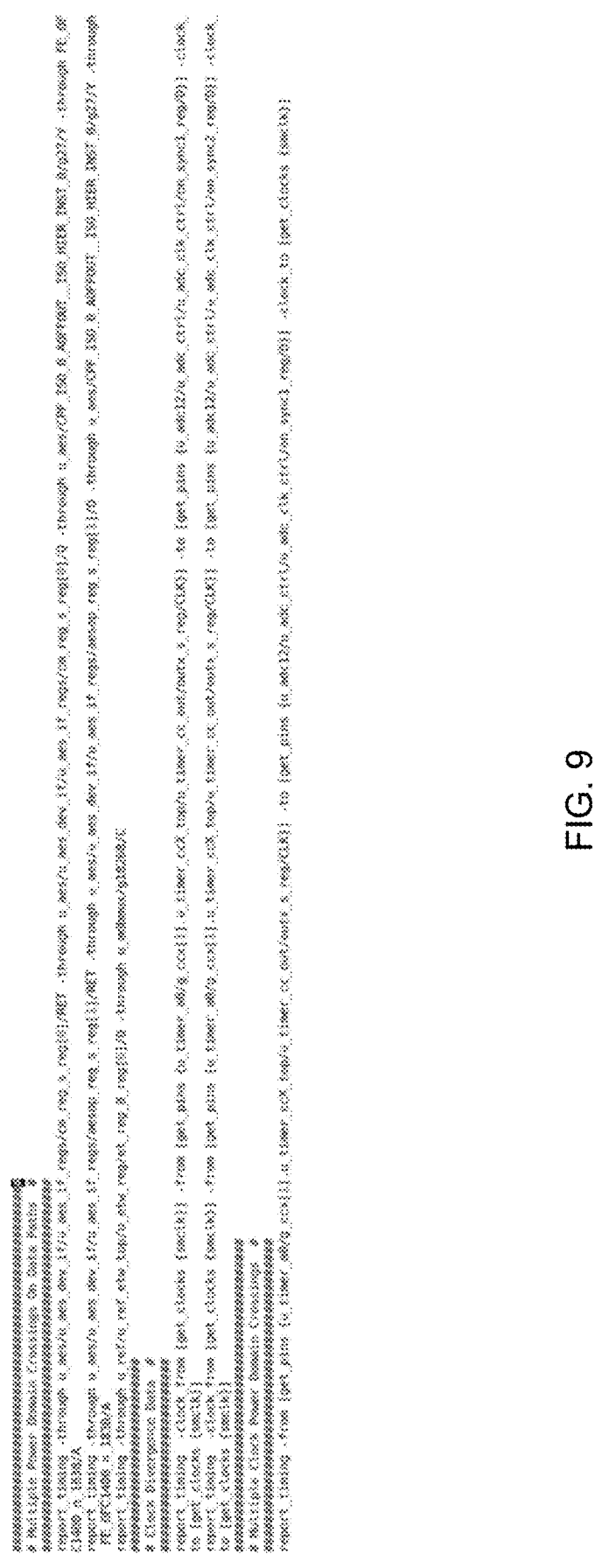

In some embodiments, automatic fault detection process 10 may be configured to report the faulty paths in the IPD path set using multiple presentation mechanisms. Path descriptions may be generated for the faulty paths, including for a fault category based upon user input. This allows the user to report the paths from an STA session and take the corrective action as needed. FIG. 9 shows an example graphical user interface 900 showing the output for path descriptions for different IPD path fault types.

Figure 11:
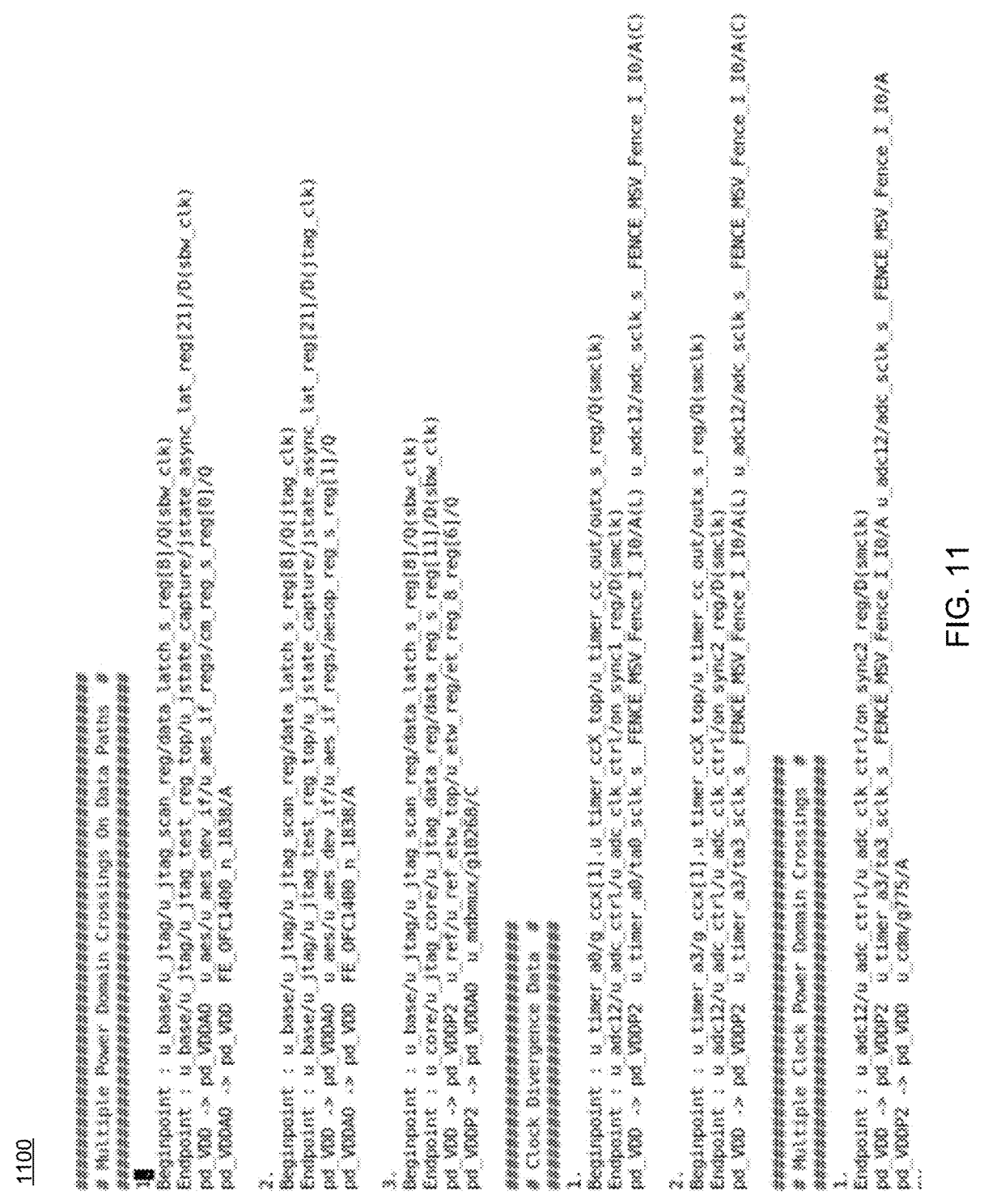

In some embodiments, while path descriptions are exhaustive in the way that they cover the complete set of faulty paths for the given fault type, it may be helpful to present the path and extract the power/voltage domain transitions leading to the fault. For a user to be able to identify which power/voltage domain transition is causing the maximum faults in the system, automatic fault detection process 10 may produce a summary of the faulty path counts due to given power/voltage domain transition, allowing the user to have a view of the state of the design and the area of maximum concern to fix the faults. FIG. 10 shows an example graphical user interface 1000 showing the faulty IPD path count summary that may be generated by the tool. FIG. 11 shows an example graphical user interface 1100 depicting the detailed presentation mechanism to report each type of the fault, along with one faulty path due to the given power/voltage transition. This allows the user a view of the voltage transition point or a group of voltage transition points, leading to the IPD faults along with one faulty path due to each of these.

Embodiments of automatic fault detection process 10 provide numerous advantages over existing approaches. For example, embodiments described herein provide the ability to extract the faulty IPD paths from a full design. Embodiments may extract the IPD paths from the full design STA session. Accordingly, in most cases the IPD logic is less than 10% of the top-level logic, and the process may efficiently mine the faulty IPD paths. The fault detection is CPPR aware in the analysis view where the fault detection is performed.

Embodiments of automatic fault detection process 10 may identify the faulty IPD paths and perform fault detection with agility and robustness due to its graph based approach. As such, the process operates efficiently over the multitude of paths and performs a smart selection of paths by analyzing the design structural information, making TAT very efficient. For large scale designs it can become almost impossible to cover all IPD paths using path based reporting, and if the actual IPD paths are high positive slack paths, it may not be possible to ever reach those paths. In general, any path based approach will face both capacity and accuracy challenges. From a capacity standpoint, the runtime of reporting all IPD only paths and then filtering the faulty paths by examining paths is very high, to an extent that it is becoming impractical for larger designs. From an accuracy standpoint, IPD paths which are due to power domain crossings on the clock network only, cannot be reported by reporting the paths through these crossings, as they are on the clock network. This makes extracting such paths an even bigger challenge and results at times may be optimistic also.

Embodiments of automatic fault detection process 10 may mine path level power domain transition and transition instance/net information for the faulty IPD paths in the design. This mining may further include other timing path artifacts, some of which may include, but are not limited to, begin point, end point, clocks etc. The approach is CPPR aware and graph based.

Embodiments of automatic fault detection process 10 may present one or more faulty paths. Exhaustive path descriptions may be generated covering the entire set of faulty IPD paths and they may be classified on the fault type. A path count summary may be generated that may quantify the severity of fault regions and concentration of faulty paths. Detailed power/voltage transition point reporting generates an exhaustive combination of all power/voltage transition points in the design, along with one path impacted due to this combination.

Embodiments included herein may provide the ability to filter and present specific faults as the process may be calibrated to report paths for a specific type of fault, for reducing the search space. Embodiments may also provide the ability to present paths for a specific fault region as the process may be user calibrated to report paths specific to a fault region based upon by the exact power/voltage domain transition point or group of points wherever applicable.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for automatic fault detection during a timing analysis comprising:
    reading, using a processor, design and power intent information associated with an electronic design;
    automatically identifying a plurality of inter-power domain paths from the design and power intent information;
    automatically filtering the plurality of inter-power domain paths to identify one or more faulty inter-power domain paths using a graph-based approach, wherein identifying the one or more faulty inter-power domain paths reduces a search space; and
    automatically generating a report depicting the one or more faulty inter-power domain paths.

2. The computer-implemented method of claim 1, further comprising:
    receiving a user input identifying a fault type or fault region.

3. The computer-implemented method of claim 1, wherein the graph based approach includes generating an inter-power domain graph.

4. The computer-implemented method of claim 1, wherein the inter-power domain graph includes a direct acyclic graph representation of connectivity and adjacency information of all power domain crossings in the electronic design.

5. The computer-implemented method of claim 4, wherein the report includes at least one of exact power domain transition information, instance/net transition information, data path information, clock path information, and capture path information.

6. The computer-implemented method of claim 1, wherein identifying one or more faulty inter-power domain paths is common path pessimism removal aware.

7. The computer-implemented method claim 1, wherein identifying one or more faulty inter-power domain paths includes mining path level power domain transition and transition instance/net information including begin point, end point, and clock information.

8. A non-transitory computer-readable storage medium having stored thereon instructions for automatic fault detection during a timing analysis that when executed by a machine result in the following operations:
    reading, using a processor, design and power intent information associated with an electronic design;
    identifying a plurality of inter-power domain paths from the design and power intent information;
    filtering the plurality of inter-power domain paths to identify one or more faulty inter-power domain paths using a graph-based approach, wherein filtering includes identifying an exact location of a power domain crossing, wherein identifying the one or more faulty inter-power domain paths reduces a search space; and
    generating a report depicting the one or more faulty inter-power domain paths.

9. The non-transitory computer-readable storage medium of claim 8, further comprising:
    receiving a user input identifying a fault type or fault region.

10. The non-transitory computer-readable storage medium of claim 8, wherein the graph based approach includes generating an inter-power domain graph.

11. The non-transitory computer-readable storage medium of claim 8, wherein the inter-power domain graph includes a direct acyclic graph representation of connectivity and adjacency information of all power domain crossings in the electronic design.

12. The non-transitory computer-readable storage medium of claim 11, wherein the report includes exact power domain transition information and instance/net transition information.

13. The non-transitory computer-readable storage medium of claim 8, wherein identifying one or more faulty inter-power domain paths is common path pessimism removal aware.

14. The non-transitory computer-readable storage medium of claim 8, wherein identifying one or more faulty inter-power domain paths includes mining path level power domain transition and transition instance/net information including begin point, end point, and clock information.

15. A system for automatic fault detection during a timing analysis comprising:
    a computing device having at least one processor configured to read design and power intent information associated with an electronic design, the at least one processor further configured to identify a plurality of inter-power domain paths from the design and power intent information and filter the plurality of inter-power domain paths to identify one or more faulty inter-power domain paths using a graph-based approach, the at least one processor further configured to generate a report depicting the one or more faulty inter-power domain paths, wherein identifying the one or more faulty inter-power domain paths reduces a search space.

16. The system of claim 15, wherein the at least one processor is further configured to receive a user input identifying a fault type or fault region.

17. The system of claim 15, wherein the graph based approach includes generating an inter-power domain graph.

18. The system of claim 15, wherein the inter-power domain graph includes a direct acyclic graph representation of connectivity and adjacency information of all power domain crossings in the electronic design.

19. The system of claim 18, wherein the report includes exact power domain transition information and instance/net transition information.

20. The system of claim 15, wherein identifying one or more faulty inter-power domain paths is common path pessimism removal aware.

\* \* \* \* \*